United States Patent
Frimodig

(10) Patent No.: US 6,363,066 B1
(45) Date of Patent: Mar. 26, 2002

(54) METHOD AND ARRANGEMENT FOR COMBINED DATA AND POWER DISTRIBUTION USING A COMMUNICATION BUS

(75) Inventor: Hans-Ove Frimodig, Göteborg (SE)

(73) Assignee: Mecel AB (SE)

( * ) Notice: Subject to any disclaimer, the term of this patent is extended or adjusted under 35 U.S.C. 154(b) by 0 days.

(21) Appl. No.: 09/155,389

(22) PCT Filed: Feb. 13, 1998

(86) PCT No.: PCT/SE98/00267

§ 371 Date: Sep. 28, 1998

§ 102(e) Date: Sep. 28, 1998

(87) PCT Pub. No.: WO98/37642

PCT Pub. Date: Aug. 27, 1998

(30) Foreign Application Priority Data

Feb. 21, 1997 (SE) .............................. 9700633

(51) Int. Cl.⁷ ............................................. H04L 12/50
(52) U.S. Cl. ..................... 370/360; 370/489; 710/110
(58) Field of Search ................ 370/464, 465, 370/489, 490, 360, 248, 282, 400, 437, 438, 439, 451; 714/100, 2, 4; 375/257; 710/100, 107, 110

(56) References Cited

U.S. PATENT DOCUMENTS

| | | | |
|---|---|---|---|
| 5,321,689 A | * 6/1994 | Suzuki | 370/228 |
| 5,446,846 A | * 8/1995 | Lennartsson | 710/100 |
| 5,572,658 A | * 11/1996 | Mohr | 714/4 |
| 5,592,485 A | * 1/1997 | Consiglieri | 370/360 |
| 5,617,282 A | * 4/1997 | Rall | 361/56 |
| 5,809,077 A | * 9/1998 | Dorner | 375/257 |

FOREIGN PATENT DOCUMENTS

| | | |
|---|---|---|
| DE | 4438836 | 4/1995 |
| DE | 19501887 | 7/1995 |
| DE | 4425250 | 1/1996 |
| DE | 19520596 | 12/1996 |
| EP | 0656696 | 6/1995 |
| WO | 9604735 | 2/1996 |

* cited by examiner

Primary Examiner—Douglas Olms
Assistant Examiner—Ricardo M. Pizarro
(74) Attorney, Agent, or Firm—Ostrolenk, Faber, Gerb & Soffen, LLP

(57) ABSTRACT

A method and arrangement for combined data- and power distribution between nodes (MA, SL, $SL_N$) in distributed data processing systems having a common communication bus (1, $CAN_H/CAN_L$) in which the communication bus includes at least one wire or differentiated dual wires transmitting digital information serially in form of dominant data bits at a first signal level ($U_1/U_3$ $V_{D2}$) and recessive data bits at a second lower signal level ($U_2$, $V_{D1}$) in a sequential order dependent on the content of the data being transmitted. Nodes (SL) having a low power consumption obtain power supply through dominant bits being transmitted on the bus (1), which dominant bits charge a capacitance (15) in the low effect nodes (SL). Nodes (MA) having a higher power consumption obtain power supply from a voltage source ($V_1$) separated from the bus. At least one node (MA) of the high effect nodes includes an amplification unit (20–24) which will be activated automatically in order to amplify the potential of dominant bits being transmitted by a low effect node.

12 Claims, 3 Drawing Sheets

METHOD AND ARRANGEMENT FOR COMBINED DATA AND POWER DISTRIBUTION USING A COMMUNICATION BUS

BACKGROUND OF THE INVENTION

The present invention relates to a method for combined data- and power distribution using a communication bus according the preamble of claim 1 and an arrangement able to implement the method 6.

It is known to combine data- and power distribution using a common wire. As an example could data could be contained as superposed information on the power transmission. This could be realised in state-of the art distribution of electricity in the form of alternating current, where the basic alternating current at a frequency in the range of 50–60 Hz could contain data in the form of a superposed frequency at a substantially higher frequency.

SUMMARY OF THE INVENTION

An object of the invention is to enable a simple distribution of power supply using a communication bus, which communication bus also is used to transmit serial data information in digital form. As a consequence a separate power supply wire could be spared.

Another object is to enable power supply to a number of distributed nodes with a low power consumption, which nodes only include some simple form of diagnostics or detection and lacking any power consuming actuators.

Yet another object is to enable the opportunity to connect low effect as well as high effect nodes to the communication bus, which low effect nodes do not need any separate power supply in contrast to the high effect nodes demanding a separate power supply in order to assure proper functionality.

By the inventive method and arrangement simple nodes for performing diagnostic functions could be connected to the communication bus without any need for a separate power supply. Such type of diagnostic nodes with associated sensors could have a low power consumption, and be used in order to verify environment or functionality. In vehicles could such low effect nodes could typically correspond to nodes being able to detect temperatures, and arranged in different sub-systems of the vehicle, such as the drive-train of the vehicle, for temperature monitoring purposes.

Other distinguishing features and advantages of the invention are evident from the and the following description of preferred embodiments which is made by reference to the drawings.

DETAILED DESCRIPTION OF PREFERRED EMBODIMENTS

Figure 1:
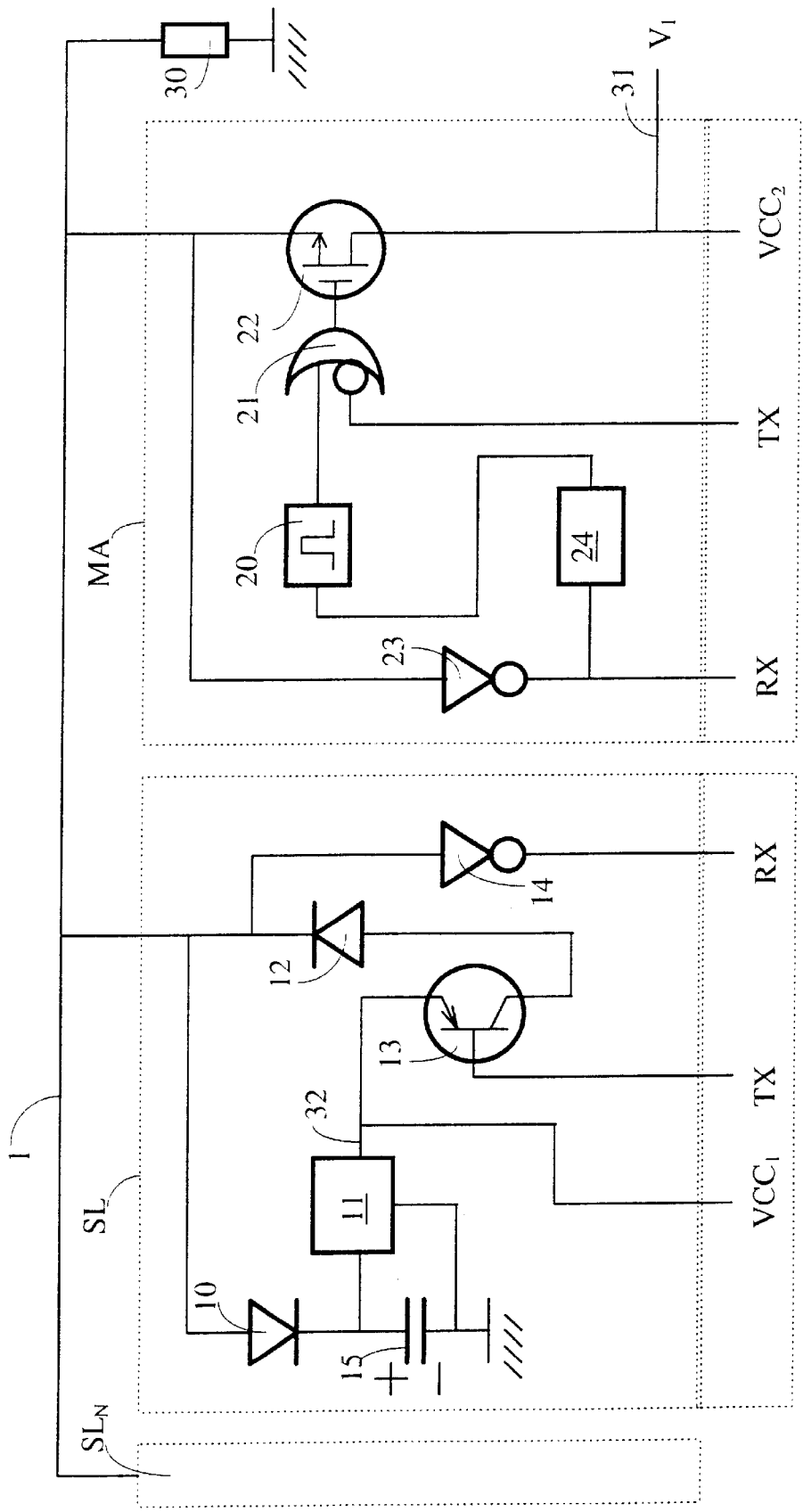
FIG. 1 shows schematically an inventive arrangement having a low effect node obtaining its power supply via the communication bus, and a high effect node obtaining its power supply via external power supply and able to distribute power supply to the low effect node

In FIG. 1 is schematically shown a system containing a master node, MA, and at least one slave node, SL. The master node and slave node communicate via the communication bus 1, which in a conventional manner could be terminated by a terminating resistance 30.

The communication bus transmits serial information in digital form, using dominant and recessive bits, i.e. corresponding to logical "1" or "0".

The dominant bits could in a conventional system implemented in vehicles having a 12 volts power supply system, correspond to the 12 volts voltage level, $V_1$. The recessive bits could then as an example correspond to a 0 voltage level.

When the master node is about to transmit a dominant bit, then the transmitter output TX is pulled down to a low state, resulting in the transistor 22 becoming conductive and the system voltage $V_1$, i.e. $VCC_2$, will be connected to the communication bus. The master node MA obtain its power supply via a separate power supply wire 31. The power supply wire is connected to a power source. preferably 12 volt in a vehicle having a 12 volt battery.

The receiver input RX of the master node is used in order to verify, via the inverter 23, a correct transmission of messages on the communication bus, or control if there are any messages being transmitted on the communication bus 1 from other nodes.

The slave node is lacking any separate power supply. The slave node is instead equipped with a voltage accumulator 15, which via a diode 10 could be charged by dominant bits being transmitted on the communication bus 1. More than one slave node SL could be connected to the communication bus, which is indicated by the slave node $SL_N$.

Because the slave nodes will subject the dominant bits to an electrical load, a power resistant transistor 22 is needed in the master node MA, preferably a MOSFET-transistor, in the figure shown as a P-channel type.

The slave node will obtain its power supply from the voltage accumulator 15 via a voltage regulator 11. The voltage regulator 11 could preferably transform the voltage to a reduced level, preferably from a 12 volt level at the voltage accumulator to a 5 volt level at the output 32.

A supply voltage will then be obtained at the output 32 for the logic circuitry of the slave node.

When the slave node is about to transmit a message containing dominant bits, then the transmitter output TX is pulled down to a low state, resulting in the transistor 13 becoming conductive and $VCC_1$ as a consequence being connected to the communication bus. The receiver input RX of the slave node is used, via inverter 14, for verification of correct transmission of messages on the communication bus or control of any messages being transmitted on the communication bus 1 from other nodes.

In order for the dominant bits obtain proper power transmission capability, an amplifier function is included in the master nodes which automatically will bias the signal level of the dominant bit.

A bit detector 24 is arranged at the input RX of the master node, detecting dominant bits on the bus. When the bit detector 24 detects a dominant bit the pulse amplifying stage 20 will be activated. The pulse amplifying stage will shift the transistor 22 to a conductive state during a predetermined duration corresponding to at least a part of the duration for one bit in the data.

The transistor 22 is controlled by a logical "or"-circuitry 21, having an inverted input connected to TX. The transistor 22 will thus be shifted to a conductive state if either TX assumes a low state or if the signal from the pulse amplifying stage assumes a high state, resulting in the power supply of the master node $VCC_2$ being connected unattenuated to the communication bus 1. The communication bus could thus be loaded without affecting the signal, and the voltage accumulator of the slave nodes could obtain proper charge.

Figure 3:
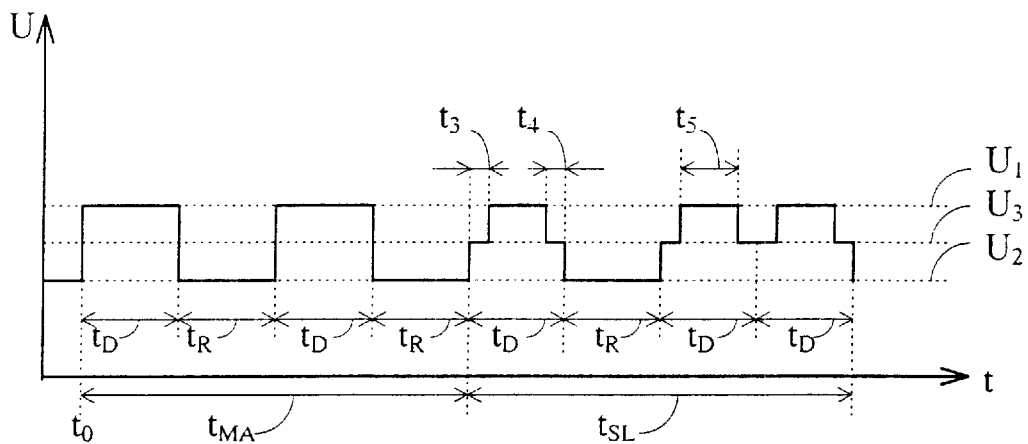
FIG. 3 shows a signal state diagram for a communication bus according to FIG. 1.

In FIG. 3 is shown transmission of data on the communication bus using the embodiment shown in FIG. 1. Transmission of dominant bits will lead to the voltage level on the communication bus assuming a first signal level $U_1$, preferably a nominal voltage of 12 volt. Transmission of recessive bits will lead to the voltage level on the communication bus assuming a lower second signal level $U_2$, preferably a nominal voltage of 0 volt. If the dominant bits represents a logical "0" and the recessive bits represents a logical "1", and the time for one bit corresponds to $t_D$ and $T_R$ respectively, then transmission of the data "01010100" will be obtained in FIG. 3 starting from the point of time $t_0$.

In FIG. 3 is shown an initial transmission of two dominant bits (each having a bit duration of $t_D$) at a signal level $U_1$ from the master node MA during the time interval $t_{MA}$ and separated by recessive bits (each having a bit duration of $t_R$). After this initial transmission and during the time interval $t_{SL}$, is shown transmission of three dominant bits at a third signal level $U_3$ from a low effect node SL, and where only first and second dominant bits out of these three dominant bits are separated by a recessive bit. The amplifying function of the master node MA will commence after a time interval $t_3$, thus biasing the signal level of the dominant bit from $U_3$ up to $U_1$. The amplifying function is in force during a time interval corresponding to $t_5$, and will cease shortly before the bit duration $t_D$ expires, which will result in decrease of the signal level to $U_3$. The time intervals $t_3$ and $t_4$ are in FIG. 3 shown longer than in practice, in order to visualise the actual time delay.

The invention is not limited to the signal levels of the embodiment. Other signal levels $U_1$, $U_2$ and $U_3$, could be used for the dominant and recessive bits respectively.

Figure 2:
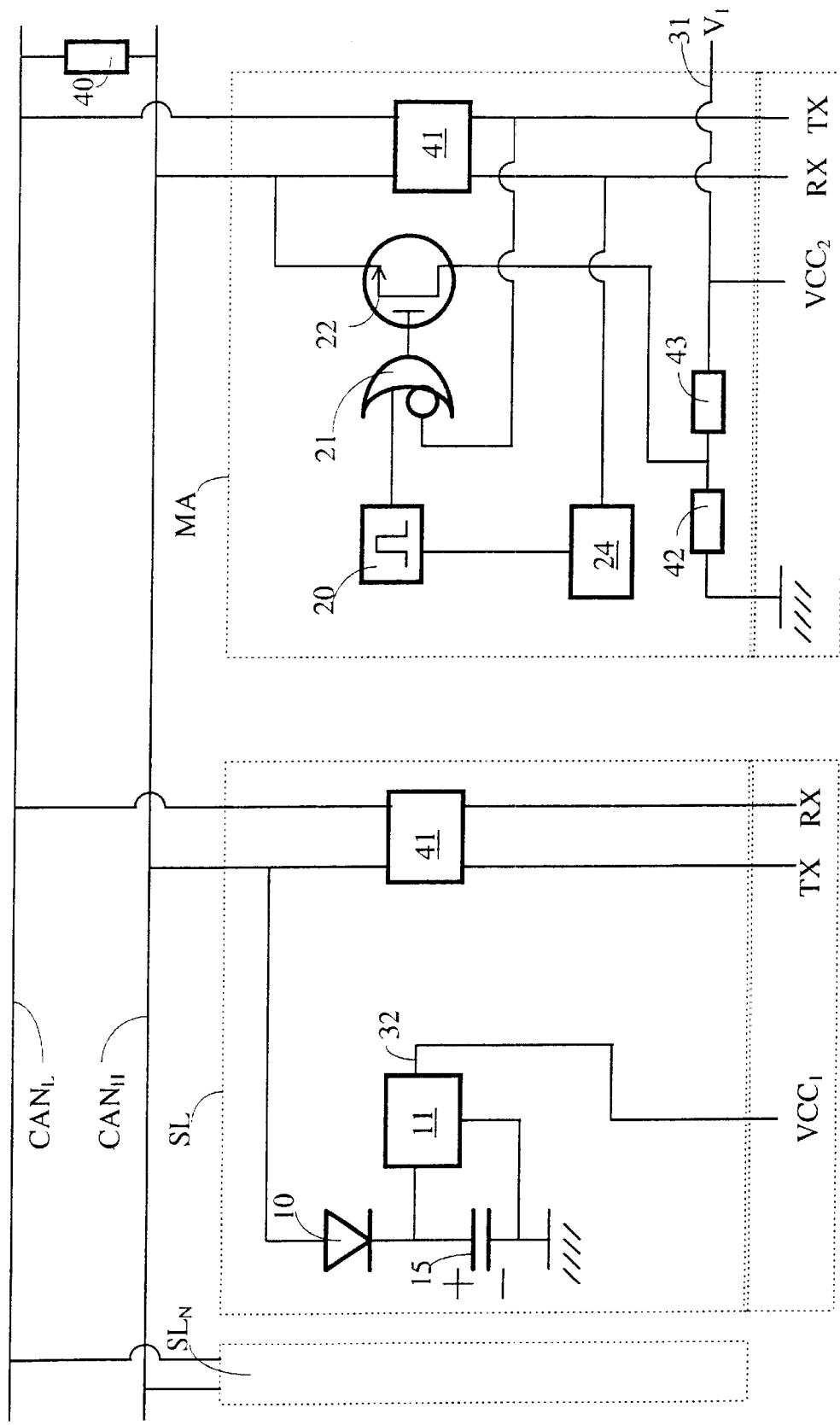
FIG. 2 shows an implementation of the invention in a communication bus having a differentiated dual wire
Figure 4:
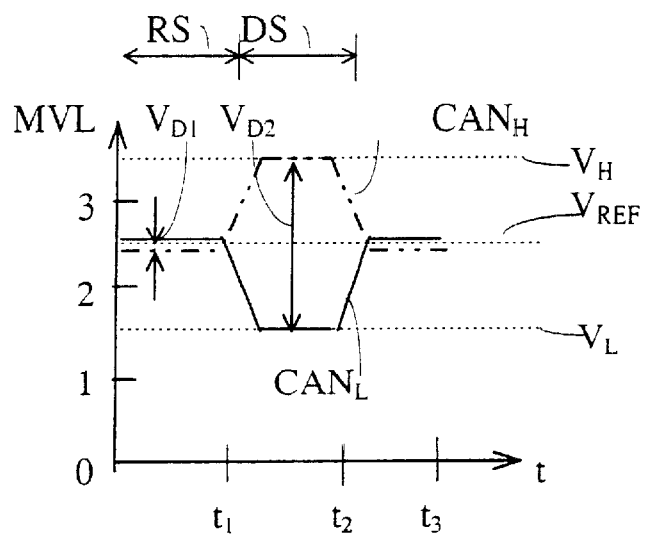
FIG. 4 shows a signal state diagram for a communication bus according to FIG. 2.

In FIG. 2 is shown an alternative implementation of the invention on a communication bus having a differentiated dual wire. Components having an equivalent function as the components shown in FIG. 1 are given the same reference symbol. This differentiated dual wire could preferably comply with requirements as of the standard ISO 11898:1993, section 10.5. In FIG. 4 is shown transmission of logical "1" and "0" on the differentiated dual wire of the communication bus. In the initial condition the dual wires $CAN_L$ and $CAN_H$ are considered to be in an initial state RS (Recessive state) wherein each wire is set to a fixed voltage offset $V_{REF}$ in relation to electrical ground.

The difference of potential $V_{D1}$ between the dual wires $CAN_L$ and $CAN_H$ is in the initial state RS at a substantially zero voltage level. In FIG. 4 the voltage potentials of $CAN_L$ and $CAN_H$ have been separated slightly in order to make the figure more legible.

The initial state RS corresponds to a logical representation of a "1", and is assumed as soon as a "1" should be transmitted on the communication bus, and is also the default state when the bus is in idle condition (Bus idle), waiting for a transmission.

At the point of time $t_1$ the dual wires are changed to a dominant state DS, wherein one of the wires is subjected to a decrease of the voltage level in relation to electrical ground, from a level $V_{REF}$ down to a level $V_L$. The other wire is subjected to an increase of the voltage level in relation to electrical ground, from a level $V_{REF}$ up to a level $V_H$. When the difference of potential $V_{D2}$ between the dual wires $CAN_L$ and $CAN_H$ exceeds a predetermined level the dominant state DS is assumed. The dominant state corresponds to a logical representation of a "0", and is assumed as soon as a "0" should be transmitted over the communication bus.

It is the difference of potential $V_{D1}/V_{D2}$ between the dual wires $CAN_L$ and $CAN_H$ which will determine if an initial state or dominant state exist, i.e. a logical "1" or "0".

A communication using a differentiated dual wire will enable increased interference suppression because external interference is most likely to affect both wires in an analogous fashion, i.e. a voltage spike would increase or decrease voltage levels of the wires in the same order. Such types of interference could thus not affect the present state of the bus (i.e. "1" or "0").

The interface to the CAN-bus is in FIG. 2 obtained by a standard circuit 41 known as such, for example a standard circuit corresponding to "Philips 82C250". This circuit will manage the differentiation of the signal according FIG. 4, and contains receiver input RX and transmitter output TX. A charge of the voltage accumulator 15 will be obtained in an analogous fashion as in FIG. 1. With a communication bus having a differentiated dual wire, $CAN_H$ and $CAN_L$, the voltage accumulator is connected to the particular wire of the dual wires that is biased to an increased voltage $V_H$ during a dominant state, see DS in FIG. 4. The voltage accumulator 15 is charged via diode 10, and the slave node SL obtains its power supply via the voltage regulator 11. Components 12–14 in FIG. 1 are replaced entirely by the circuit 41. In order for the dominant bits being sent by the slave node to obtain a sufficient power transmission efficiency, the master node MA in FIG. 2 is equipped with an amplifying function corresponding to the one shown in FIG. 1. The bit detector 24 in FIG. 2 is directly connected to the RX input of the circuit 41, and the TX output connected to the circuit 41 is also connected to the "or"-circuit 22.

The transistor 22 is thus switched to a conductive state if either TX assumes a low state or if the signal from the pulse amplifying stage 20 assumes a high state, resulting in the power supply of the master node $VCC_2$ being connected via voltage dividing resistors 42 and 43 and the transistor 22 to the communication wire $CAN_H$. Alternatively a voltage regulator could be used instead of the voltage dividing resistors. The voltage division, or control of a voltage regulator, is implemented in order to adapt the voltage from a normal 12 volt level to the level specified for $CAN_H$ in the dominant state.

One of the wires, i.e. $CAN_H$, in the differentiated dual wire could thus be loaded without affecting the signal, and the slave nodes could charge the voltage accumulator 15.

By signal level is meant either the difference of potential in dual-wire busses or the potential in relation to electrical ground in single-wire busses. A high signal level on the communication bus could thus correspond to either a difference in voltages between dual-wires, $V_{D2}$ in FIG. 4, exceeding a predetermined difference of potential, or a specific potential of voltage in relation to electrical ground, $U_1/U_3$ in FIG. 3, exceeding a predetermined threshold, $U_2$.

The system could preferably include a control function monitoring transmission of data, said data containing dominant bits, continuously being sent over the communication bus. In the case of the communication bus being in an idle state, i.e. a recessive state, during an excessive time period, a transmission of so-called "dummy"-instructions could be initiated. These "dummy"-instructions not involve any effect upon node functions, and are only implement with a view to transmitting dominant bits on the communication bus and thus maintaining the voltage accumulator in a charged condition.

Because that the voltage accumulator 15 is charged via diode 10 by the dominant bits of the biased signal level, either when the master is sending messages or when the amplifying function of the master node is activated, the slave nodes will not be laden by charging of the voltage accumulator 15.

With the embodiment shown in FIG. 1, where the voltage levels $U_1$, $U_2$, $U_3$ corresponds to 12, 0 and 6 volts respectively, the diode 10 of the slave nodes will not become conductive when a slave node applies the signal level $U_3$ on the communication bus, because the voltage accumulator is charged at a higher voltage $U_1$.

The invention could be modified in a number of ways within the scope of the invention as defined by the enclosed claims.

Although the present invention has been described in relation to particular embodiments thereof, many other variations and modifications and other uses will be come apparent to those skilled in the art. It is preferred, therefore, that the present invention be limited not by the specific disclosure herein, but only by the appended claims.

What is claimed is:

1. Method for combined data and power distribution between nodes in distributed data processing systems having a common communication bus for the nodes containing at least one wire on which digital information is transmitted serially in a form of dominant data bits at a first signal level and recessive data bits at a second lower signal level, which method comprises:

selectively transmitting from a first node via the communication bus dominant and recessive bits, the dominant bits from the first node causing at least one wire of the communication bus to assume a first voltage level exceeding a voltage level of the wire during transmission of recessive bits;

selectively, transmitting from a second node via the communication bus dominant and recessive bits, the dominant bits from the second node causing the at the least one wire of the communication bus to assume a second voltage level which second voltage level exceeds or is equal to the first voltage level, said first node lacking any separate power supply, while said second node being equipped with a power supply separate from the communication bus;

charging a voltage accumulator in the first node by the dominant bits being transmitted on the communication bus from the second node, causing said at least one wire of the communication bus to assume a voltage level corresponding to the second voltage level, thereby providing the first node with power; and detecting with the second node the voltage level on the communication bus and, if a lower voltage level of the dominant bit is detected, then increasing the voltage level of the dominant bit from said first to said second voltage level during at least part of the duration of the dominant bit.

2. Method for combined data and power distribution between nodes in distributed data processing systems having a common communication bus for the nodes containing at least one wire on which digital information is transmitted serially in a form of dominant data bits at a first signal level and recessive data bits at a second lower signal level, which method comprises:

selectively transmitting from a first node via the communication bus dominant and recessive bits, the dominant bits from the first node causing at least one wire of the communication bus to assume a first voltage level exceeding a voltage level of the wire during transmission of recessive bits;

selectively, transmitting from a second node via the communication bus dominant and recessive bits, the dominant bits from the second node causing the at the least one wire of the communication bus to assume a second voltage level which second voltage level exceeds or is equal to the first voltage level, said first node lacking any separate power supply, while said second node being equipped with a power supply separate from the communication bus;

charging a voltage accumulator in the first node by the dominant bits being transmitted on the communication bus from the second node, causing said at least one wire of the communication bus to assume a voltage level corresponding to the second voltage level, thereby providing the first node with power;

detecting with a detection circuit in the second node the presence of a dominant bit on the communication bus; and automatically connecting, using a connecting member, an external voltage source to the at least the one wire of the dual wire bus having a higher voltage potential during at least a part of the duration of the detected dominant bit.

3. Arrangement for combined data- and power distribution between nodes in distributed data processing systems having a common communication bus for the nodes, said communication bus containing at least one wire at which digital information is transmitted serially in the form of dominant data bits at a first signal level and recessive data bits at a second lower signal level, which arrangement comprises:

first logic circuitry in a first node which during transmission of a dominant bit on the communication bus connects a wire of the communication bus to a first voltage level by means of a first voltage connecting devices, which first voltage level exceeds a voltage level at the wire during transmission of recessive bits;

second logic circuitry in a second node which during transmission of a dominant bit on the communication bus connects the wire of the communication bus to a second voltage level by means of a second voltage connecting devices, which second voltage level exceeds or is equal to said first voltage level; and a voltage accumulator in said second node, said voltage accumulator being connected to the wire of the communication bus via a blocking member which only allows a current to be developed from the communication wire to said voltage accumulator, and thus prevents the voltage accumulator from discharging to said communication bus, which voltage accumulator constitutes the power supply for said second node; wherein the second node includes detector circuitry detecting dominant bits on the communication bus, which detector circuitry when a dominant bit is detected connects an external voltage source to at least one of the wires in the communication bus having a higher voltage potential during transmission of a dominant bit.

4. Arrangement for combined data- and power distribution between nodes in distributed data processing systems having a common communication bus for the nodes, said communication bus containing at least one wire at which digital information is transmitted serially in a form of dominant data bits at a first signal level and recessive data bits at a second lower signal level, which arrangement comprises:

first logic circuitry in a first node which during transmission of a dominant bit on the communication bus connects a wire of the communication bus to a first voltage level by means of a first voltage connecting devices, which first voltage level exceeds a voltage level at the wire during transmission of recessive bits;

second logic circuitry in a second node which during transmission of a dominant bit on the communication bus connects the wire of the communication bus to a second voltage level by means of a second voltage connecting devices, which second voltage level exceeds or is equal to said first voltage level;

a voltage accumulator in said second node, said voltage accumulator being connected to the wire of the communication bus via a blocking member which only allows a current to be developed from the communication wire to said voltage accumulator, and thus prevents the voltage accumulator from discharging to said communication bus, which voltage accumulator constitutes the power supply for said second node; and a voltage regulator connected to the voltage accumulator, which voltage regulator adapts the voltage from the voltage accumulator to a voltage level compatible with the first logic circuitry, wherein the second node includes detector circuitry detecting dominant bits on the communication bus, which detector circuitry when a dominant bit is detected connects an external voltage source to at least one of the wires in the communication bus having a higher voltage potential during transmission of a dominant bit.

5. Method according to claim 1, which includes reducing the voltage of the voltage accumulator of the second node to a voltage level adapted to operate logic circuitry in said second node.

6. Arrangement according to claims 3 or 4, wherein the communication bus is a differentiated dual wire and the voltage accumulator is connected via the blocking member to the one wire of the communication bus having a higher voltage potential during transmission of a dominant bit.

7. Arrangement according to claim 6, wherein the blocking member is a diode.

8. Arrangement according to claim 7, wherein the voltage accumulator is a capacitor.

9. Arrangement according to claim 3, further including a semiconductor switch responsive to said detector circuitry for connecting the external voltage source to the at least one wire of the communication bus when said detector circuitry detects a dominant bit on the communication bus.

10. Arrangement according to claim 9, further including a pulse amplifier connected to said detection circuitry for amplifying an output of said detection circuitry.

11. Arrangement according to claim 4, further including a semiconductor switch responsive to said detector circuitry for connecting the external voltage source to the at least one wire of the communication bus when said detector circuitry detects a dominant bit on the communication bus.

12. Arrangement according to claim 11, further including a pulse amplifier connected to said detection circuitry for amplifying an output of said detection circuitry.

* * * * *